UNITED STATES PATENT OFFICE.

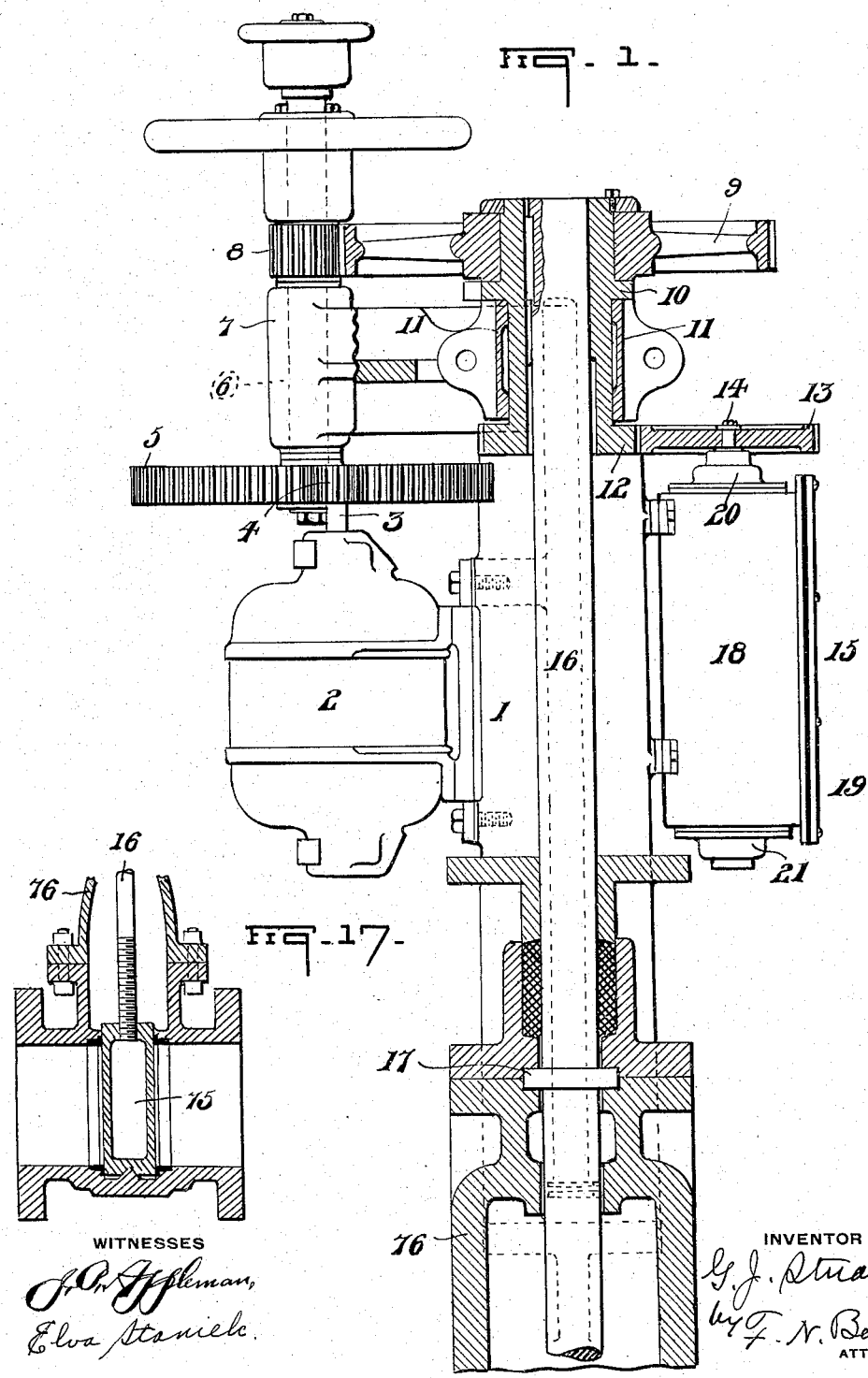

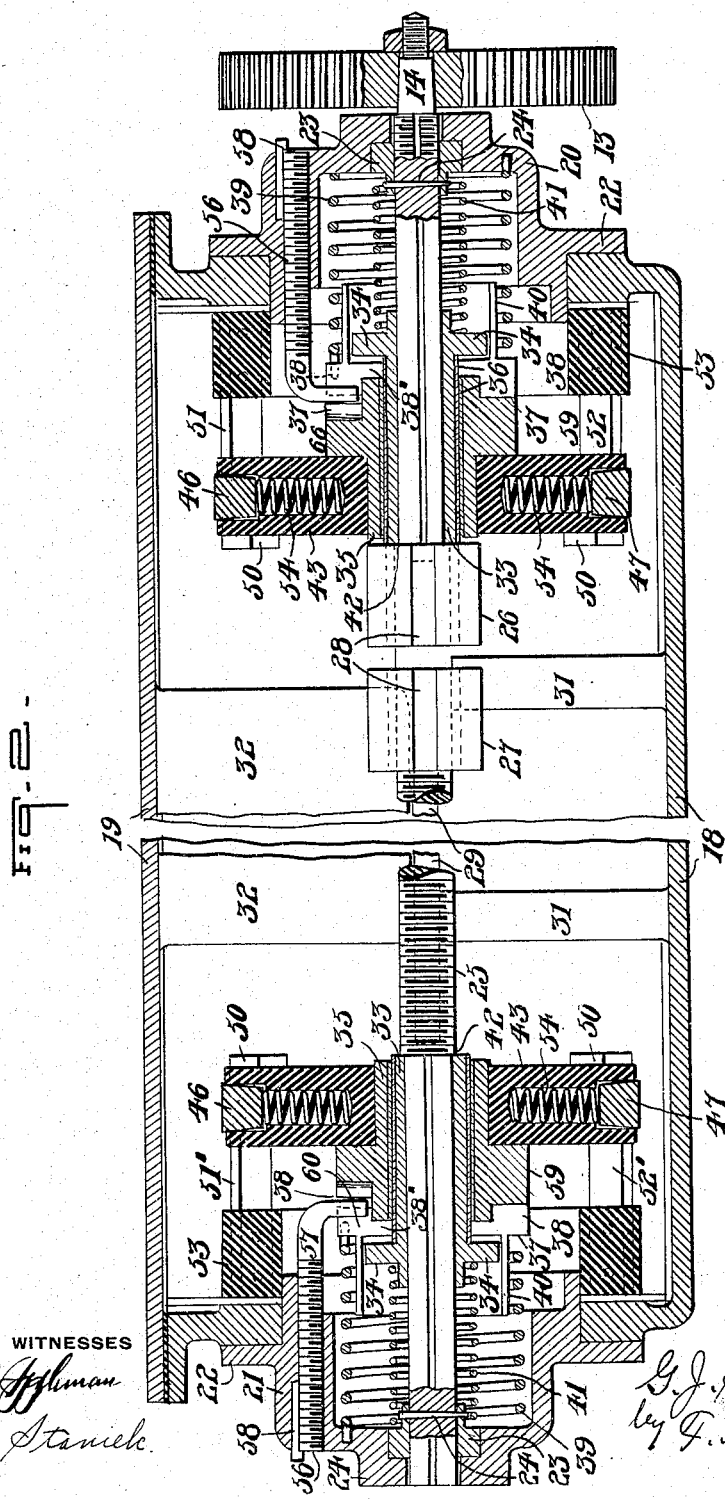

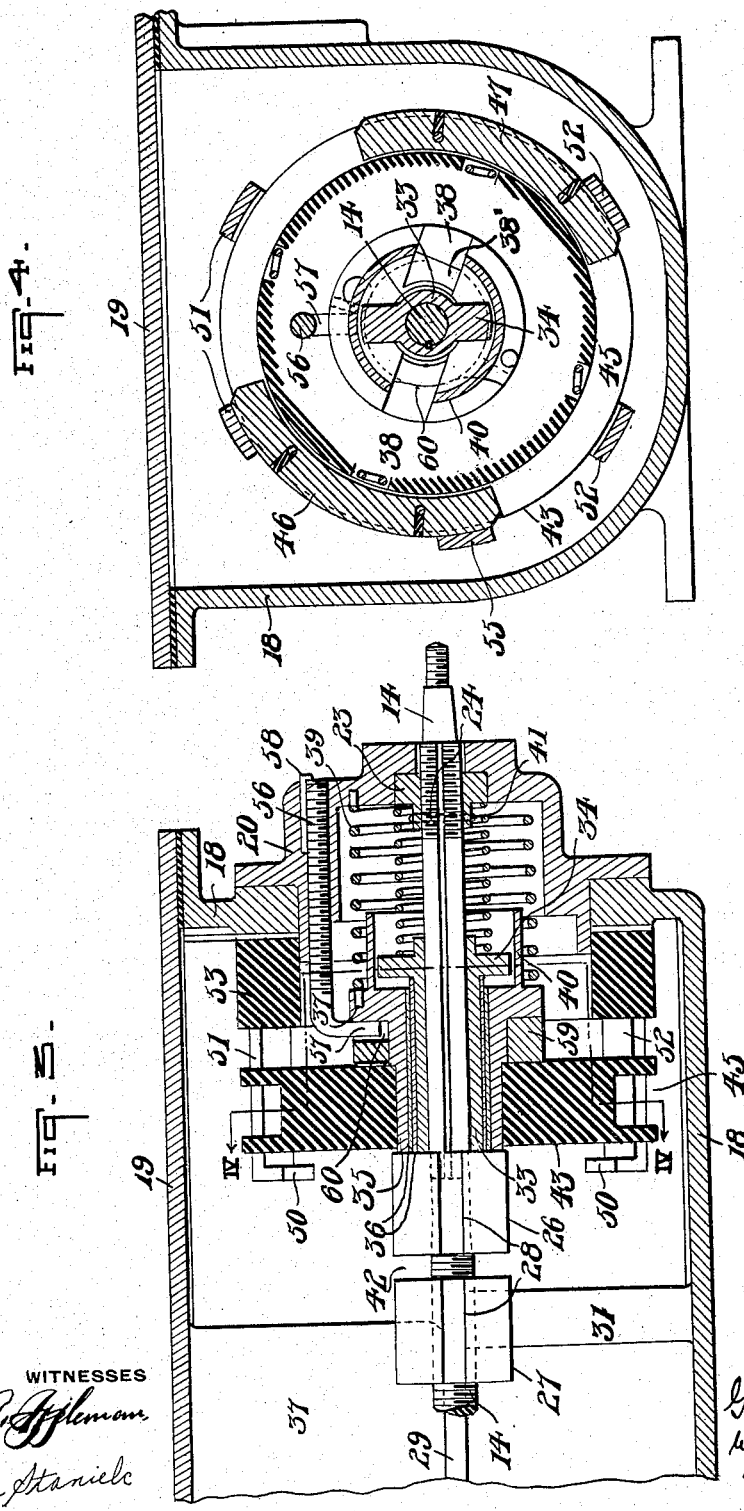

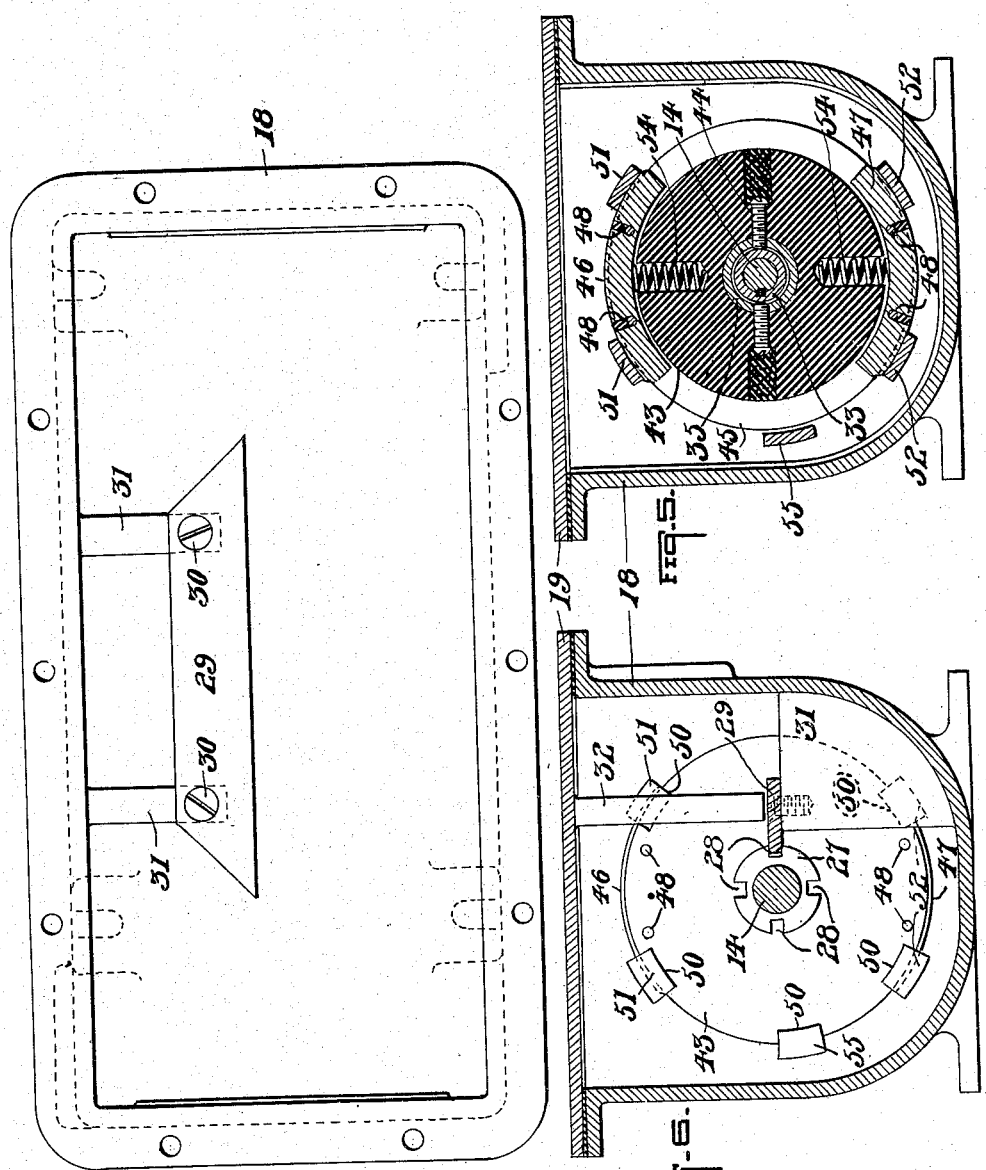

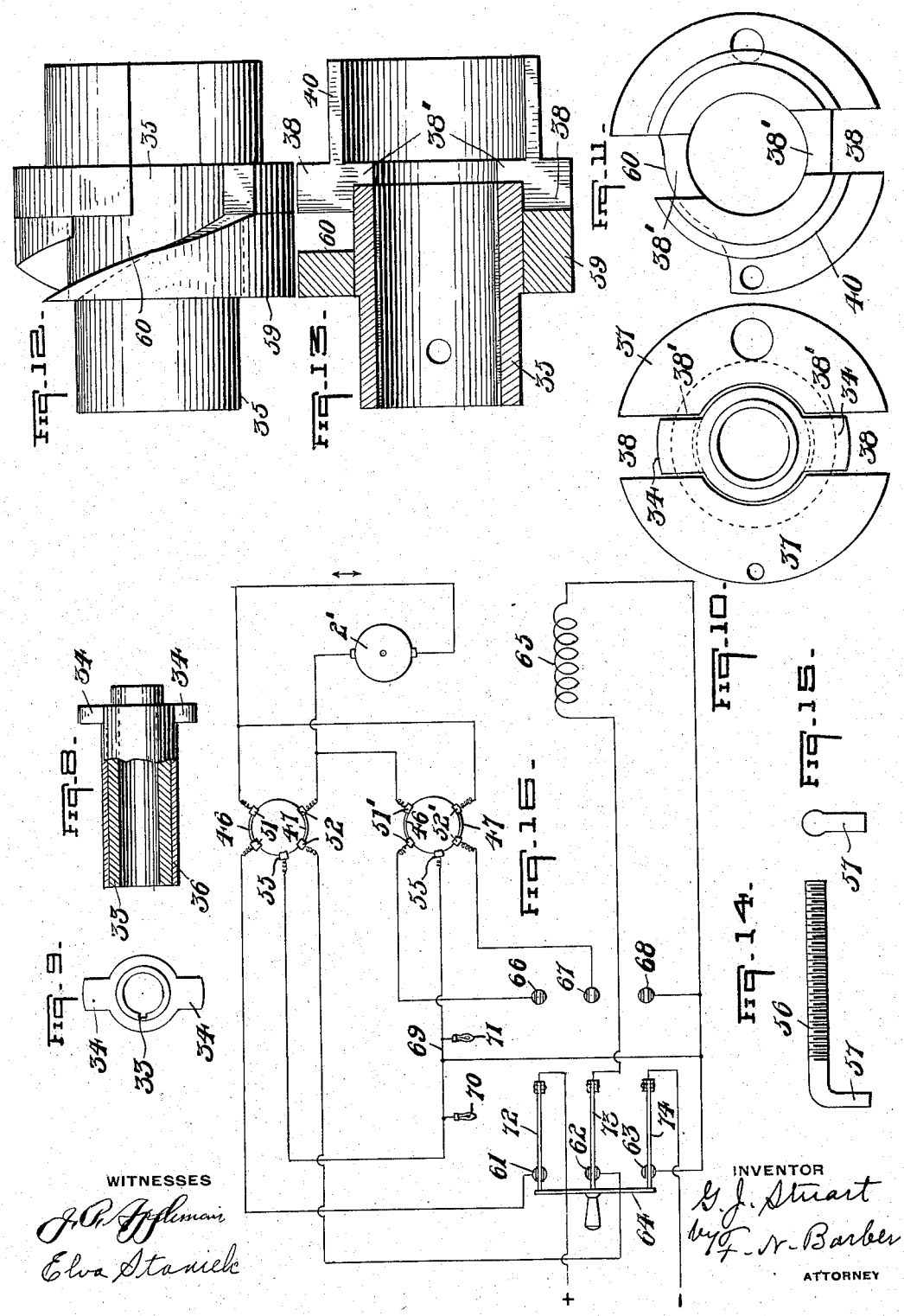

GEORGE J. STUART, OF BELLEVUE, PENNSYLVANIA, ASSIGNOR TO THE PITTSBURGH VALVE, FOUNDRY AND CONSTRUCTION COMPANY, OF PITTSBURGH, PENNSYLVANIA, A CORPORATION OF PENNSYLVANIA.

LIMIT-CONTROLLER FOR MOTORS.

1,154,274.   Specification of Letters Patent.   Patented Sept. 21, 1915.

Application filed November 1, 1913. Serial No. 798,658.

*To all whom it may concern:*

Be it known that I, GEORGE J. STUART, a citizen of the United States, residing at Bellevue, in the county of Allegheny and State of Pennsylvania, have invented new and useful Improvements in Limit-Controllers for Motors, of which the following is a specification.

My invention relates to safety limit stops for electric motors. Although I have illustrated my invention in connection with a gate-valve, it is not restricted to the same, as my invention is applicable to any apparatus requiring one or more limit stops.

It is the object of my invention to make the controller automatic and beyond the power of the operator to interfere with its normal operation; to prevent any damage in case the starting switch is thrown in the wrong direction when it is desired to move the controller mechanism from one of its limits; and to indicate by one signal or another, preferably a visual signal, at which limit the mechanism has arrived and when it arrives at a limit.

Motor-operated gate-valves have, in some instances, been controlled simply by a reversing switch and an automatic circuit breaker. Under this system the motor was stalled when the gate-valve reached a limit of travel, and the circuit breaker was thrown open when the amperage rose sufficiently high. This system was used only with direct current and frequently the gears or valve stems were broken.

In some systems a limit switch has been used in combination with a reversing switch and a shunt trip circuit breaker. With this system, there is danger that the operator will hold the circuit breaker closed, and thereby jam the valve or other mechanism. Also dirt may get under the contacts of the limit switch, preventing current from reaching the shunt trip coil, thereby causing the valve or equivalent to be jammed.

With my invention the operator cannot interfere with the normal operation of the controller and no damage results if the starting switch is thrown in the wrong direction at either limit, merely a lamp being lighted to show him his mistake, and no movement would take place in the controller, or controlled mechanism.

Referring to the accompanying drawings, Figure 1 is a longitudinal section, partly in elevation showing my invention applied to the stem of a gate-valve; Fig. 2 a longitudinal section of the motor controller with the parts in the positions assumed when the controlled mechanism is between its limits; Fig. 3, a view of the right-hand portion of Fig. 2 with the parts at one limit, the brushes 46 and 47 being omitted; Fig. 4, a section on the line IV—IV, Fig. 3; Fig. 5, a cross section of the controller, taken through the disk 43 with the parts as they are between the limits, or as they are on Fig. 2; Fig. 6, a cross-section of Fig. 1 on a line between the nuts 26 and 27, Fig. 2; Fig. 7, a plan of the controller casing with the cover removed; Fig. 8, a side view, partly in section of the sleeve 35; Fig. 9, an end view of Fig. 8; Fig. 10, an enlarged view of the inner ends of a pair of coöperating sleeves 33 and 35; Fig. 11, a similar view of the sleeve 35 and the cam collar 59; Fig. 12, an enlarged side elevation of a combined sleeve 35 and cam collar 59; Fig. 13, a longitudinal section of Fig. 12; Fig. 14, a side view of the stop screw 57; Fig. 15, an end view of Fig. 14; Fig. 16, a wiring diagram of the electric circuits for use with a direct current shunt wound motor; and Fig. 17, a section of a gate-valve controlled by the stem 16.

On the drawings, 1 represents a frame on which the electric motor 2 is mounted. The motor shaft 3 carries the pinion 4 gearing with the gear wheel 5 which is supported by the shaft 6 in the housing 7 supported by the frame 1. The shaft 6 has thereon the pinion 8, which meshes with the gear wheel 9 on the sleeve 10, rotatable on the bearing 11 on the frame 1. The sleeve 10 carries the spur-gear 12 which meshes with the gear-wheel 13 on the shaft 14 of the controller 15.

16 is a shaft having its axis coincident with the axis of the sleeve to which it is keyed so as to rotate therewith. The shaft 16 has the bearing 17 in the frame and extends beyond the frame where it may be connected to a gate valve or other device having opposite limits of travel. For the purposes of the present invention it may be assumed that the shaft 16 must be set into rotation and brought to a stop automatically when it has rotated a certain number of times in one direction; that its direction of rotation must be reversed; that it must be stopped automatically when it has had a certain number of rotations in the reverse direction; this cycle of operations to be repeated at the will of the operator. The controller 15 is the means for causing the motor 2 to stop when the shaft 16 has rotated the desired number of times in either direction. This controller comprises the casing 18 and the mcehanism within the same.

19 is the cover for the casing, which is secured to the frame 1.

20 and 21 are caps which are seated in alined holes in the ends of the casing 18 and provided with the flanges 22 resting against the outer faces of the said ends of the casing. The inner faces of the caps are recessed to receive the bearing collars 23 secured to the shaft 14 by the cross-pins 24. The shaft 16 extends through central openings in the ends of the caps and is supported by the said collars 23. The central portion of the shaft 14 is provided with the screw-threads 25.

26 and 27 are two nuts which coöperate with the threads 25. These nuts have in their peripheries the slots 28 parallel with the screw to receive the edge of the bar 29, secured by the screws 30 to the two lugs 31 on the inner face of the casing 18. The cover 19 has the bar 32 with its lower edge over the heads of the screws 30 to prevent them from accidentally unscrewing.

Referring now to the mechanism on Fig. 2 between the nut 26 and the cap 20, 33 is a sleeve splined on the shaft 14 so as to cause the sleeve to turn with the shaft and permit the sleeve to slide longitudinally thereof. The outer end of the sleeve is provided with the wings or lugs 34 extending outwardly at right angles thereto. 35 is a sleeve both slidable and rotatable on the sleeve 33, there being preferably one or more brass sleeves 36 between the sleeves 33 and 35. The outer portion of the sleeve 35, just inwardly from the lugs 34, is provided with the outwardly extending flange 37 provided with the radial slots 38 located and proportioned so as to receive the lugs 34, as hereinafter described. 39 is a coiled expansion spring seated between the cap 20 and the outer face of the flange 37, the latter having an annular flange 40 on its outer end and inside the spring 39 to center the latter. The aforesaid lugs 34 are within the flange 40. The spring 3 is partially coiled under tension so as to tend to rotate the sleeve 35 toward the observer (Figs. 2 and 3) or to the left (Fig. 4). 41 represents a coiled expansion spring seated between the inner face of the adjacent bearing collar 23 and the outer end of the sleeve 33, there being flanges or collars on the outer end of the sleeve 33 and the inner face of the collar 23 to center the ends of the spring 41. The inward movement of the sleeve 33 is limited by its engagement with the shoulder 42 on the shaft 14.

To the inner end of the sleeve 35 the disk 43 composed of insulating material is secured by the screws 44 and provided with the annular groove 45. At diametrically opposite positions in the groove 45 I place the brushes 46 and 47 composed of electric conducting material, such as carbon, the brushes being held in place with their outer edges beyond the disk 43 by means of the cross-pins 48 extending through the slots 49 in the brushes and into the adjacent walls of the groove 45. The inner travel of the disk 43 and sleeve 35 is limited by the engagement of the inner face of the disk near its edge with the hooks or lugs 50 which are bent down on the inner ends of the contacts 51 and 52 composed of good conducting material, such as copper, and have the outer ends secured to the insulating block or disk 53 lying between the disk 43 and the adjacent end of the casing 18. The contacts 46 and 47 are forced outwardly against the pins 48 or the contacts 51 and 52 by the coiled expansion springs 54 in sockets in the disk 43. 55 is another contact located between one of the brushes 51 and one of the brushes 52, and mounted the same as the latter and arranged and constructed to be engaged by the brushes 46 and 47 as hereinafter described. The contacts are all parallel with the shaft 14. The contact 55 has a hook 50 like the other contacts 51 and 52. The hooks or stops 50 are so located that when the disk 43 engages them, the sleeve 33 moves independently of the disk, under the action of the spring, so as to bring the lugs 34 into the inner portions 38' of the slots 38 and the end of the sleeve against the shoulder 42, provided the nut 26 does not prevent the same, the purpose of which will be explained presently.

56 is a screw extending through the cap 20 and having its inner end bent toward the shaft 14 into the hook 57 which may stand in one of the slots 38 to prevent the rotation of the sleeve 35, as shown in Fig. 2, or stand against the outer face of the flange 37 to prevent the movement of the sleeve 35 inwardly under the action of the spring 39. The screw 56 is held from rotation by the key 58, which is removable to permit the rotation of the screw and the adjustment of the hook 57.

The collar 59 is secured to the sleeve 35 between the disk 43 and the flange 37 and has in its periphery a cam groove or slot 60 which at one end opens into the slot 38 into which the hook 57 extends, and extends spirally away from the observer (Figs. 2, 3, and 12).

The parts at the left-hand end of Fig. 2 are the same as at the other end but they are arranged in the reverse order; in other words, if the right-hand portion of Fig. 2 be revolved 180° on an axis at right angles to the shaft 14 at a point between the disks 43, it would be the same as the left-hand end portion. The two ends of Fig. 1 are alike in the sense that the human hands are alike except that the arrangement of the parts are reversed. This explanation will obviate the necessity of describing further the left-hand portion of Fig. 2, except with respect to the operation of the mechanism shown in this portion. The reference letters in the two said portions of Fig. 2 are the same except as hereinbefore made different, and except that the upper brushes are marked 51' instead of 51, and the lower 52' instead of 52 (Fig. 16) for convenience of explanation.

On Fig. 16, I show the armature terminals connected respectively to one contact 51 and one contact 52, and also respectively to one contact 51' and one contact 52'. The three switch contacts 61, 62, and 63 on one side of the double throw switch 64 are connected, respectively, to the remaining contact 51, the remaining contact 52, and one terminal of the series motor field 65, while the other three switch contacts 66, 67, and 68 on the other side of the switch 64 are connected, respectively, to the remaining contact 52', and the same field terminal to which the switch contact 63 is connected. The contacts 55 are connected together by a wire 69 having the two electric lamps 70 and 71 in series therein. At a point between the lamps the wire 69 is connected to the switch contacts 63 and 68. The remaining field terminal is connected to the positive line, which is also connected to the blade 72 of the switch. The negative line is connected to the switch blades 73 and 74.

The operation of my invention is as follows: The electric circuits are as shown on Fig. 16 and the controller parts are as shown on Figs. 2 and 5. The parts are in the position assumed just before the motor is to be stopped, it being assumed that the motor is rotating the shaft 14 so as to cause the nuts 26 and 27 to travel to the right. The motor 2 has caused the nut 26 to merely contact with the end of the sleeve 33. As the mechanism at the left on Fig. 2 will now remain idle, because the lugs 34 are not in the slots 38', the description will now relate to the mechanism at the right hand end of Fig. 2 unless otherwise stated. As the motor 2 rotates it rotates both the shaft 14 and the shaft or stem 16, the latter causing the operation of some apparatus which must be stopped at a definite place or position. The nut 26 is adjusted on the shaft 14 so that it will cause the motor 2 to stop when the shaft or stem 16 has rotated the exact number of times to bring the said apparatus to the desired position or condition. If the shaft 16 is connected to the gate of a valve so as to cause the gate to open or close according to the direction in which the shaft is rotated, it is clear that the shaft must stop when the gate reaches certain limits in either direction in order to prevent the jamming of the gate or the destruction or injury to some part of the valve or other mechanism. On Fig. 17, I have shown the shaft 16 threaded to the gate 75 of the valve 76 so as to cause the gate to open and close in an obvious and well known manner as the shaft is rotated in one direction or the other. As the nut 26 travels to the right from the position shown, it begins to push the latter outwardly, thereby causing the flange 37 to move to the right and compress the spring 41. When the sleeve 33 has been pushed to the right a short distance, the nut 26 engages the end of the sleeve 35, the sleeve 33 normally projecting inwardly farther than the sleeve 35. Then the nut 26 pushes both sleeves 33 and 35 outwardly until the flange 37 is moved beyond the hook or stop 57, whereupon the spring 39 rotates the sleeve 35 toward the observer, the inner face of the flange 37 sliding behind the hook 57 (Fig. 3), which will prevent the inward movement of the sleeve 35 until the flange 37 has been rotated back so that the slot 38 comes again in line with the hook 57.

During the time the motor has been running, the current through the armature (Fig. 16) has been passing from the positive line through the switch blade 72, the switch contact 61, the contacts 51 and the brush 46, the armature 2', the contacts 52 and the brush 47, the switch contact 62, the switch blade 73, and the series field 65 to the negative line. When the spring 39 rotates the sleeve 35 toward the observer, as was just described, the brush 46 was moved (see Figs. 4 and 16) to interrupt the current between the contacts 51, the brush 47 was moved to interrupt the current between the contacts 52, and the brush 46 was moved to connect one of the contacts 51 to the contact 55. The interruption of the circuit between the contacts 51 and between the contacts 52, cut off the supply of current to the armature and brought the motor to rest at the proper time to prevent any damage which would have resulted from an overtravel of the motor. The connection of one of the contacts 51 to the contact 55 caused current to flow from the first contact 51 through the brush 46, the contact 55, the lamp 70, the switch contact 63, and the switch-blade 74 to the negative line. The current in this circuit causes the lamp 70 to glow, thereby indicating that the gate 75 of the valve has been closed, or other mechanism controlled by the motor has reached one limit. When the sleeve 35 is rotated toward the observer as described, the cam 59 moved with it, the hook 57 standing in the groove 60 during the movement of the cam.

When it is desired to close the gate 75 or to cause the motor to rotate in the opposite direction, a definite number of times or to move any connected mechanism to an opposite limit to that at which the motor has previously brought the same, the operator throws the switch 64 so that the blades 72, 73, and 74 engage the contacts 66, 67, and 68, respectively, whereupon the motor will rotate in the reverse direction, the current now traveling through the contacts 51' and 52' and the brushes 46 and 47 at the left hand end of Fig. 2. The armature current flows from the positive through the switch blade 72, the switch contact 66, the contacts 51', the brush 46, the armature 2' in the reverse direction from that taken before, the contacts 52', the brush 47, the switch contact 67, the switch blade 72 and the series field 65, to the negative line. As the field current flows the same as before while it is reversed in the armature, the latter will reverse its direction of rotation. The nuts 26 and 27 will now begin to travel to the left. As the nut 26 moves to the left, the sleeve 33 under the tension of the spring 41 moves with it until the sleeve engages the shoulder 42 on the shaft 14. As the hook 57 holds the sleeve 35 and the flange 37 from moving to the left with the nut 26, the sleeve 33 moves its lugs 34 into the portion 38' of the slots 38. As the shaft 14 is rotating and the sleeve 33 is splined thereto, the lugs 34 cause the sleeve 35 to be rotated back away from the observer to its original position against the torsion of the spring 39 and until the adjacent slot 38 is brought into line with the hook 57 whereupon the spring 39 forces the sleeve to the left so that the hook 57 again stands in the said slot 38. At the same time, the brushes 51 and 52 have been returned to position shown on Fig. 16, with the contacts 51 connected by the brush 46 and the contacts 52 connected by the brush 47 (Figs. 5 and 16). Also at the same time the left hand movement of the sleeve taking place under the action of the spring 39 has moved the slots 38' away from the lugs 34 so that the rotation of the shaft 14 can no longer rotate the sleeve 35 and the disk 43. This leaves the mechanism at the right hand end of Fig. 2 in condition to be again operated, as already described and as shown on Fig. 5, for stopping the motor when the nut 26 is again moved to the right.

Returning now to what takes place as the nut 27 is moving to the left, during which it may be assumed that the shaft 16 is rotating so as to close the gate 75, or that the mechanism controlled by the motor is approaching its other or second limit, the nut 27 will eventually engage the end of the sleeve 33, and after pushing it slightly to the left, engage the end of the sleeve 35. Thereafter the nut 27 will push both sleeves to the left until the flange 37 passes beyond the hook 57 whereupon the spring 39, which has been previously put under tortional strain, will cause the sleeve together with the disk 43 to be rotated away from the observer, the hook 57 standing as a stop in the cam groove 60 to prevent the return of the sleeve 35 to the right until it has been rotated to its original position, as will be explained. The motor will be brought at once to rest because the rotation of the disk 43 has caused the brush 46 to leave one contact 51', and the brush 47 to leave one contact 52'. At the same time the brush 46 has moved to connect the other contact 51' to the contact 55, which connects the lamp 71 to the source of current supply as it is obvious from Fig. 16, the lighting of the lamp 71 indicating that the gate 75 has been opened or that the mechanism moved by the motor has reached its other limit of travel.

When the switch 64 has been returned to the position shown on Fig. 2, the nuts 26 and 27 will move to the right. At first the sleeve 33 will follow the nut 27 until it reaches the shoulder 42 by which time the lugs 34 will be in the slot 38'. As the shaft 14 is rotating, the lugs 34 will rotate the sleeve so as to return the slot 38 opposite the hook 57. When the slot 38 reaches this position the spring 39 forces the sleeve 35 and the disk 43 to the right until the latter engages the stops 50. This movement of the sleeve 35 to the right draws the slots 38' away from the lugs 34 so that the latter cannot longer rotate the sleeve 35, the parts standing as shown on Fig. 2, the brush 46 bridging the contacts 51' and brush 47 bridging the contacts 52', as shown on Fig. 16. The cam grooves 60 are employed to insure that the sleeves 35 shall move to the positions shown on Fig. 2 in case the springs should for any reason fail to so move them.

The time of causing the disks 43 to rotate and thereby stop the motor 2, can be adjusted by removing the cover 19, then removing the plate 29, and then rotating the nut 26 or 27 or both to the proper position on the shaft 14. After the adjustment or adjustments have been made the plate is inserted in alined slots 28 in the nuts and secured to the lugs 31, and the cover 19 is returned, the parts appearing as in Fig. 6.

It is seen that it is not necessary that the nuts 26 and 27 shall travel to their limits, as described, before the motor and consequently the travel of the nuts are reversed. It will be seen that, except when the nuts have pushed the sleeves 35 outwardly at one limit or the other of their travel, the parts are as in Fig. 16, which clearly indicates that the motor will run in one direction or the other according as the switch 64 is in engagement with one set of switch contacts or the other.

My invention is evidently not limited to direct current motors.

I claim—

1. In a limit controller for electric motors, an electric motor, a switch in circuit with the motor, means for automatically opening the switch, means for releasably holding the switch closed, a limit device driven by the motor and arranged to mechanically release the said holding means and means whereby the limit device may be reversed at will prior to its release of the holding means.

2. In a limit controller for electric motors, an electric motor, a switch in circuit with the motor, means for automatically opening the switch, means for releasably holding the switch closed, mechanism moved by the motor for directly releasing the said holding means and means whereby the limit device may be reversed at will prior to its release of the holding means.

3. In a limit controller for electric motors, an electric motor, a switch in circuit with the motor, means for automatically opening the switch, means for releasably holding the switch closed, means driven by the motor and independent of electric current for releasing the said holding means and means whereby the said mechanism may be reversed at will prior to its release of the holding means.

4. In a limit controller for electric motors, an electric motor, a switch in circuit with the motor, means for automatically opening the switch, means for releasably holding the switch closed, a limit device driven by the motor and arranged to mechanically release the said holding means, means for reversing the motor, means for automatically resetting the switch when the motor has moved the limit device in the reverse direction and means whereby the said mechanism may be reversed at will prior to its release of the holding means.

5. In a limit controller for electric motors, an electric motor, a switch in circuit with the motor, means for automatically opening the switch, means for releasably holding the switch closed, a limit device driven by the motor and arranged to mechanically release the said holding means, and means whereby the motor may be reversed at will prior to the release of the holding means.

6. In a limit controller for electric motors, a rotary switch in circuit with the motor, a torsion spring for rotating the switch, means for holding the switch closed and the spring under torsional strain, and a limit device driven by the motor and arranged to engage the said means and thereby mechanically release the said switch from the holding means.

7. In a limit controller for electric motors, a reversing electric motor, mechanism constructed to be driven in opposite directions by the motor, two closed switches, one arranged to be opened by the said mechanism at one limit of its travel and to cause the motor to rotate in one direction and the other arranged to be opened by the said mechanism at the other limit of its travel and to cause the motor to rotate in the other direction, and means independent of the control of the said mechanism for connecting either switch at will to a source of current.

8. In a limit controller for electric motors, a threaded shaft, an electric motor for rotating the shaft, a nut caused to travel on the threads on the shaft by the rotation of the latter, a rotary switch in circuit with the motor, a rotary sleeve on the shaft for supporting the movable member of the switch, means for releasably holding the sleeve in position to maintain the switch closed, the said sleeve being actuated by the said nut at the limit of its travel to release the sleeve from the holding means.

9. In a limit controller for electric motors, a threaded shaft, an electric motor for rotating the shaft, a nut caused to travel on the threads on the shaft by the rotation of the latter, a rotary switch in circuit with the motor, a rotary sleeve on the shaft for supporting the movable member of the switch, a spring for urging the sleeve toward the nut, and a stop seated in a slot in the sleeve to prevent the rotation of the sleeve and to hold the switch closed, the nut being arranged to engage the sleeve and push the said slot beyond the said stop to permit the sleeve to rotate and thereby open the switch.

10. In a limit controller for electric motors, a threaded shaft, an electric motor for rotating the same, a reversing switch therefor, a rotary sleeve rotatable with the shaft and slidable thereon, a second sleeve loose on the first sleeve, a rotary switch in circuit with the motor and carried by the second sleeve, means for yieldingly urging the sleeves longitudinally and for rotating the second sleeve so as to open the switch, a stop for preventing the second sleeve from so rotating, a nut having travel on the shaft and arranged to engage the said sleeves and slide them against the tension of said means for urging the sleeves longitudinally, and push the second sleeve beyond the said stop to permit the sleeve rotating means to rotate the second sleeve behind the said stop, and means whereby, when the motor is reversed and the nut has moved in the reverse direction, the first sleeve may follow the nut for a limited distance and lock the two sleeves together to rotate the second sleeve back to its original angular position and the second sleeve may follow the nut for a greater distance to disconnect the sleeves and to re-engage the second sleeve with the stop to prevent further rotation thereof.

11. In a limit controller for electric motors, a threaded shaft, an electric motor for rotating the same, a reversing switch for the motor, a nut having travel on the shaft when the latter is rotated, a rotary snap switch at each end of the shaft, one snap switch being in the motor circuit when the motor is operated in one direction and the other in the said circuit when the motor is reversed, means engaged by the nut at each limit of its travel for releasing the corresponding snap switch, and means operated by the shaft upon the reversal of the motor to return the open snap switch to its closed position.

12. In a limit controller for electric motors, a threaded shaft, an electric motor for rotating the same, a reversing switch for the motor, a nut having travel on the shaft when the latter is rotated, a rotary snap switch at each end of the shaft, one snap switch being in the motor circuit when the motor is operated in one direction and the other in the said circuit when the motor is reversed, means engaged by the nut at each limit of its travel for releasing the corresponding snap switch, and a clutch operated by the shaft and controlled by the nut for coupling the open snap switch to the shaft when the motor is reversed and for disconnecting the clutch when the switch has been returned to its closed position.

13. In a limit controller for electric motors, a threaded shaft, two nuts having travel thereon, an electric motor, two limit switches for the motor, means actuated by one nut at one limit of the travel of the nuts to open the circuit of the motor when rotating in one direction and by the other nut at the other limit to open the circuit of the motor when rotating in the reverse direction, and means for maintaining the nuts in separate adjustments on the shaft.

14. In a limit controller for electric motors, a threaded shaft, two nuts having travel thereon, an electric motor, two limit switches for the motor, means actuated by one nut at one limit of the travel of the nuts to open the circuit of the motor when rotating in one direction and by the other nut at the other limit to open the circuit of the motor when rotating in the reverse direction, and means for maintaining the nuts in separate adjustments on the shaft, the said means comprising a fixed device engaged in openings in the nuts.

15. In a limit controller for electric motors, a threaded shaft, two nuts having travel thereon and provided with notches, an electric motor, two limit switches for the motor, means actuated by one nut at one limit of the travel of the nuts to open the circuit of the motor when rotating in one direction and by the other nut at the other limit to open the circuit of the motor when rotating in the reverse direction, and means coöperating with the said notches to hold the nuts in the desired adjustments on the shaft.

16. In a limit controller for electric motors, a threaded shaft, two nuts having travel thereon and provided with notches, an electric motor, two limit switches for the motor, means actuated by one nut at one limit of the travel of the nuts to open the circuit of the motor when rotating in one direction and by the other nut at the other limit to open the circuit of the motor when rotating in the reverse direction, a casing inclosing the shaft and nuts, lugs therein, and a plate supported by the lugs and engaging in the said notches to hold the nuts in the desired adjustments on the shaft.

17. In a limit controller for electric motors, a threaded shaft, two nuts having travel thereon and provided with notches, an electric motor, two limit switches for the motor, means actuated by one nut at one limit of the travel of the nuts to open the circuit of the motor when rotating in one direction and by the other nut at the other limit to open the circuit of the motor when rotating in the reverse direction, a casing inclosing the shaft and nuts, lugs therein, a plate supported by the lugs and engaging in the said notches to hold the nuts in the desired adjustments on the shaft, screws for holding the plate on the lugs, and a cover for the casing, having a lug opposite the screws to prevent their accidental removal.

18. In a limit controller for electric motors, an electric motor, two reversing switches, one of which is in the motor circuit, means for releasably holding the said switch closed, a limit device driven by the motor and arranged to mechanically release the said holding means, means for closing the other switch, and means for connecting at will either switch to the motor circuit.

19. In a limit controller for electric motors, an electric motor, a mechanism adapted to be driven in opposite directions by the motor, two reversing switches, both normally closed, in parallel on one motor terminal when the motor is driving the said mechanism, and a switch to connect at will either reversing switch to the remaining motor terminal.

Signed at Pittsburgh, Pa., this 28th day of October, A. D., 1913.

GEORGE J. STUART.

Witnesses:
ALICE E. DUFF,
F. N. BARBER.

Copies of this patent may be obtained for five cents each, by addressing the "Commissioner of Patents, Washington, D. C."